No. 867,510. PATENTED OCT. 1, 1907.
C. J. JUNGERS.
PROCESS OF MAKING FIRE RETARDANT GLASS.
APPLICATION FILED OCT. 29, 1906.
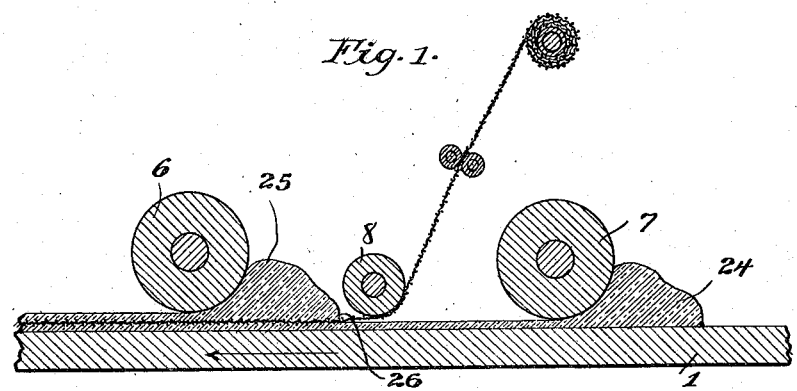
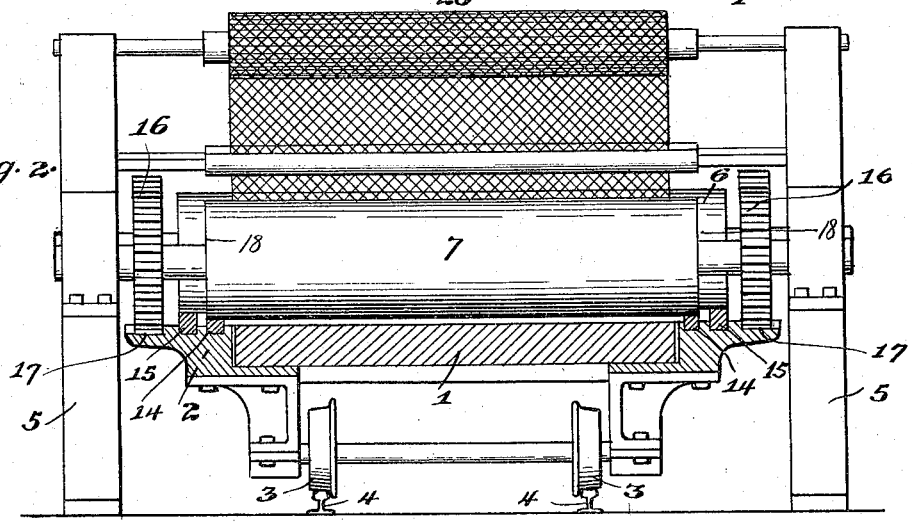
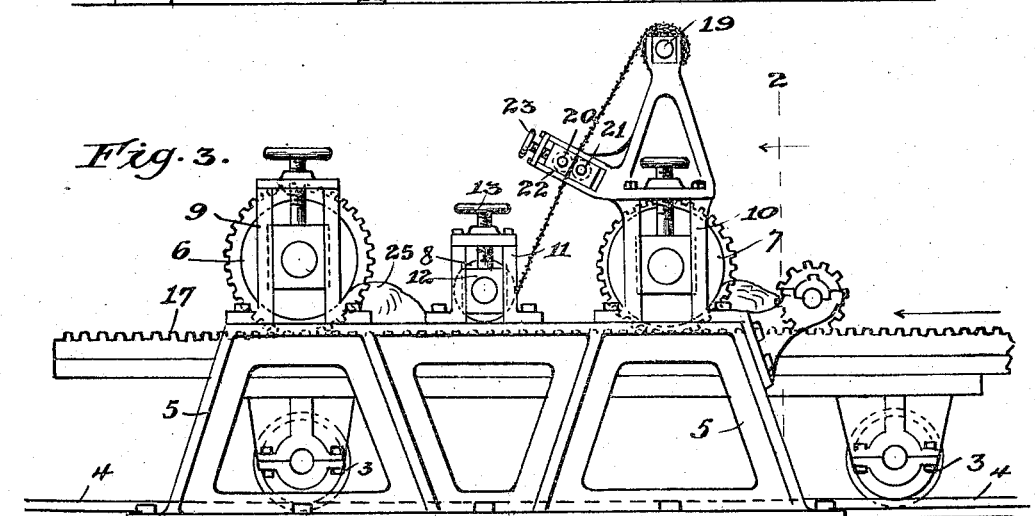
Witnesses, Inventor,

# UNITED STATES PATENT OFFICE.

CLEMENT J. JUNGERS, OF STREATOR, ILLINOIS, ASSIGNOR TO THE WESTERN GLASS COMPANY, OF STREATOR, ILLINOIS, A CORPORATION OF ILLINOIS.

PROCESS OF MAKING FIRE-RETARDANT GLASS.

No. 867,510.  Specification of Letters Patent.  Patented Oct. 1, 1907.

Application filed October 29, 1906. Serial No. 340,998.

*To all whom it may concern:*

Be it known that I, CLEMENT J. JUNGERS, a citizen of the Grand Dukedom of Luxemburg, and a resident of Streator, in the county of La Salle and State of Illinois, have invented certain new and useful Improvements in Processes of Making Fire-Retardant Glass, of which the following is a specification.

This invention relates to an improved process of making fire-retardant glass of that general type commonly known as wire-glass and it has for its objects to provide a process whereby a product of improved uniformity and quality may be economically made.

The art of making so-called wire-glass is well known, and various methods have been heretofore more or less successfully carried out. For example, it is old to form a layer of glass, impress a trellis or netting therein and thereafter close the openings formed by impressing the trellis into the surface of the layer by passing one or more following rollers thereover; it is old to form a first layer and simultaneously with the forming of such layer introduce a wire web or trellis between the advancing surface of the roller and the ball of glass so that the trellis is more or less incorporated with the upper surface of the first layer by the front roller, a second layer being subsequently formed upon this first layer containing the web; it is old to form concurrently as a progressive operation two layers of glass, one superposed upon the other, the web or wire of trellis being fed by gravity onto the upper surface of the lower layer and flooded over and incorporated between the layers as the second layer is formed upon the first by a following roller, and it is old to form two layers of glass successively, one superposed upon the other, the first layer being formed and allowed to harden sufficiently to support the trellis or web, the latter then applied to the top surface of the first layer, and the second layer thereafter formed upon the lower layer and superposed web. Each of these several methods has its own characteristics, its own advantages and its own disadvantages. For example, the glass formed by rolling out a sheet, then impressing the web into the top surface thereof, and thereafter closing the impressions by a following roll, is ununiform and rough; the wire-glass formed by introducing the wire web into and concurrently with the formation of the first layer is more brilliant and uniform in texture, but the web is liable to distortion by reason of the fact that it passes through a considerable mass of molten glass before it reaches its final position and during such passage is subject to the stresses incident to the flowing action of the glass and the crushing or pressing action of the roller, and moreover the partial exposure of the web after it passes from beneath the roller and while it is red hot, by reason of its contact with the molten glass, produces oxidation and discoloration; and the wire-glass formed by that process in which two layers are formed concurrently by means of leading and following rolls, and the wire is introduced by gravity in rear of the leading and in advance of the following roll, is also more or less defective because the wire being uncontrolled and free to warp, spring and bend as it passes into and between the layers, is not placed with uniformity or accuracy therein, while in the case of the wire-glass formed by that process in which the first layer is allowed to harden sufficiently to support the trellis before the latter is applied and the second layer started, is defective in uniformity of texture owing to the difficulty of welding a relatively hot layer of glass to a partially cooled layer.

By my present invention I obviate the several objections above enumerated.

The invention will be readily understood from the following description, reference being had to the accompanying drawings forming a part thereof, and in which—

Figure 1 is a central longitudinal vertical section of so much of the table and coöperative mechanism as is immediately concerned in the formation of the glass; Fig. 2 is a cross vertical sectional view taken approximately on line 2—2 of Fig. 3 and looking in the direction of the arrows; Fig. 3 is a side elevation of the machine.

In the drawings, 1 designates as a whole the bed of the machine or casting plate, which in the present instance is shown as being movably mounted, although, as will be readily understood by those skilled in this art, the bed may be stationary and the roller mechanism made to traverse the latter. Said bed is mounted upon a suitable frame 2 provided with truck wheels 3 arranged to traverse suitable rails 4.

At each side of the bed, and extending longitudinally along the latter, is a stationary frame 5, upon which are mounted and journaled the several rolls, as 6, 7 and 8, which coöperate in forming the product. Each roll is shown as journaled in suitable pairs of standards, as 9, 10 and 11; the rolls 6 and 7 being, as usual, so supported as to have a limited rising and falling movement, while the roll 8 is supported in journal boxes 12, the position of which may be adjusted and controlled by means of adjusting screws 13 so that said roll may be raised or lowered. The rolls 6 and 7 while journaled and confined in the corresponding frame standards are nevertheless directly supported upon trangs constructed and arranged in a manner peculiar to the present invention. That is to say, the leading roll 7 is arranged to rest and travel at each end upon a pair of trangs 14 rising above the table to a height equal to the thickness of the lower or first layer of glass, while the following roll 6 is longer and arranged to rest and travel at its ends upon a pair of trangs 15 arranged parallel with and outside of the lower trangs; these outer trangs rising to a height above the table equal to the"

full thickness of the finished product. Both rolls are provided with journal extensions or trunnions at each end to engage the corresponding journal standards, and so also each roll is provided at each end with a fixed gear, as 16, which gears severally mesh with racks 17 upon the traveling frame 2. In order that the ends of the leading roll 7 may not engage the higher outer trangs 15, said roll is provided with annular rabbets as 18.

Describing now more particularly the mechanism for controlling and directing the wire or other fire resistant reinforcement into position between the layers, and for maintaining it under tension while thus guiding it into position, the roller 8 is, as hereinbefore stated, adjustably mounted in its standards and is in practice so adjusted that its periphery approaches relatively close to, but nevertheless is kept out of contact with, the upper surface of the first layer.

Upon some suitable part of the stationary frame, as for example the standards 10 of the leading roll, is mounted a reel 19 for holding the roll of wire, and between this reel and the guiding roller 8 is mounted a pair of tension rolls 20 and 21. Conveniently the tension rolls are journaled in yoke extensions 22; the journals of the roller 21 being conveniently fixed while the journals of the coöperating roll 20 are slidably mounted in said yoke and controlled by adjusting screws, as 23.

My improved method, as carried out by the use of the mechanism herein described, is substantially as follows: A first pour or batch of glass (designated 24 in the drawing) is placed upon the bed or plate in front of the leading roller 7 and the table started to move in the direction to carry it beneath said leading roll. The wire or web 19, having been previously adjusted to position on the reel and trained through the tension rolls and beneath the guiding roll, encounters the advancing edge or top surface of the first layer as the latter passes beneath said guiding roll and immediately becomes cemented thereto and is carried along. As soon as the end of the web and first layer of glass is carried to a point beneath the following roll 6, a second pour or batch of glass (designated in the drawing 25) is placed in advance of the following roll 6, and thereafter the formation of the two layers of glass proceeds concurrently in the successive order they are started. The relatively advancing edge 26 of the second pour of glass flows over and embeds the wire or web progressively, and inasmuch as the two layers are formed progressively and concurrently the pressure of the overflowing glass will impress the web more or less into the upper surface of the first layer, so that it may be said that the web will be placed accurately coincident with the meeting surfaces of the two layers. The guiding roller 8, it is to be noted, is elevated sufficiently above the surface of the first layer and the web is drawn underneath the guiding roll under a substantial tension, so that the web is at all times held out of actual contact with both bodies of glass, i. e. the first layer and the relatively advancing edge of the second pour, until these two bodies actually meet each other along the progressing line of juncture. This is a feature of importance for this reason: until the wire comes into actual contact with the molten glass it does not become incandescent and therefore it does not oxidize or blacken or discolor, nor soften substantially so as to be subject to distortion. Passing from the periphery of the guiding roll to the point where it enters the glass, however, it is held in such close proximity to the surface of the first layer that it is heated to a considerable extent and sufficiently to remove any grease or readily combustible impurities. Moreover it will be noted that the web of wire is exposed to the radiated heat of the first layer during the greater part of its travel from the reel to the guiding roll although owing to its distance from the hot glass overheating is impossible.

By reason of the fact that the web of wire is drawn down under a substantial tension it will be obvious that the web will be held taut and accurately conform to the periphery of the roll, which will, of course, be adjusted accurately parallel with the upper surface of the first layer, from which it follows that the web of wire will enter the glass at the juncture of the two bodies with great accuracy and evenness.

That feature of the process which consists in maintaining the wire web under definite tension and accurate control up to the instant it becomes embedded in its final position is not to be underestimated since the difficulty of securing a uniform and accurate placement of the wire in glass of this character has heretofore been serious.

In practice certain weaves of wire,—those most commonly employed in making glass of this character, have a tendency to curl or the edges thereof to draw in toward the center under the action of the heat and before being incorporated or secured in the glass. By the use of tension devices and a guiding roll this tendency is largely obviated, and furthermore I prefer to roughen or slightly corrugate these rolls so as to still further control the wire and obviate this tendency.

A further feature of advantage of the present process, as carried out with the mechanism described, is this: it will be noted that the guiding roller 8 is so located with reference to the following roll 6 that when the second pour of glass is made between these two rollers it will initially fill or substantially fill the space between said rollers, and its relatively advancing edge 26, i. e. that edge which first encounters the first layer will initially assume a straight line extending across the said first layer, and this straight line will be maintained, or substantially maintained, during the entire operation of rolling the sheet because as the pour of glass is consumed the advance edge will retreat relatively to the guiding roll 8 with substantial uniformity. It follows that the wire web or trellis will therefore pass into the mass along a line which is substantially straight across the full width of the web with the result that the wire will be accurately located across the full width and length of the sheet.

The process herein described is not to be confused with certain processes of the prior art in which the layers of glass are formed as the molten material is fed or flows downwardly between forming rolls. In such processes the glass is not flooded over a metallic web resting upon or embedded in another previously formed layer and the conditions are otherwise different to such extent that the two general methods are clearly distinguished.

I claim as my invention:

1. The process of making glass having a fire-resisting material incorporated therein, which consists in concurrently forming upon a substantially horizontal support two layers of glass, one upon the other and formed in successive order, and simultaneously paying out under tension and positively and continuously directing into the relatively progressing line of juncture between the finished upper surface of the first layer and advance meeting portion of the second layer, a fire-resisting reinforcement, said reinforcement being held free from contact with either body of glass until overflowed by the relatively advancing edge of the second layer.

2. The process of making glass having a fire-resisting material incorporated therein, which consists in making a first pour of glass and starting the rolling of a layer therefrom, making a second pour of glass upon said started first layer, confining said second pour to cause its relatively advancing edge to initially assume a substantially straight line across the first layer, thereafter concurrently rolling out the two layers, one upon the other, and simultaneously paying out under tension and accurately guiding into the relatively progressing line of juncture between the finished upper surface of the first layer and advance meeting portion of the second layer, a fire-resisting reinforcement, said reinforcement being held free from contact with either body of glass until overflowed by the relatively advancing edge of the second layer.

3. The process of making glass having a fire-resisting material incorporated therein, which consists in concurrently forming upon a substantially horizontal support two layers of glass, one upon the other and formed in successive order, and simultaneously paying out under tension and positively and continuously directing into the relatively progressing line of juncture between the finished upper surface of the first layer and advance meeting portion of the second layer, a fire-resisting reinforcement.

CLÉMENT J. JUNGERS.

Witnesses:
 ALBERT H. GRAVES,
 EMILIE ROSE.